(No Model.)
G. W. BUFFORD.
CHAIN FOR SPROCKET WHEELS.
No. 589,203. Patented Aug. 31, 1897.
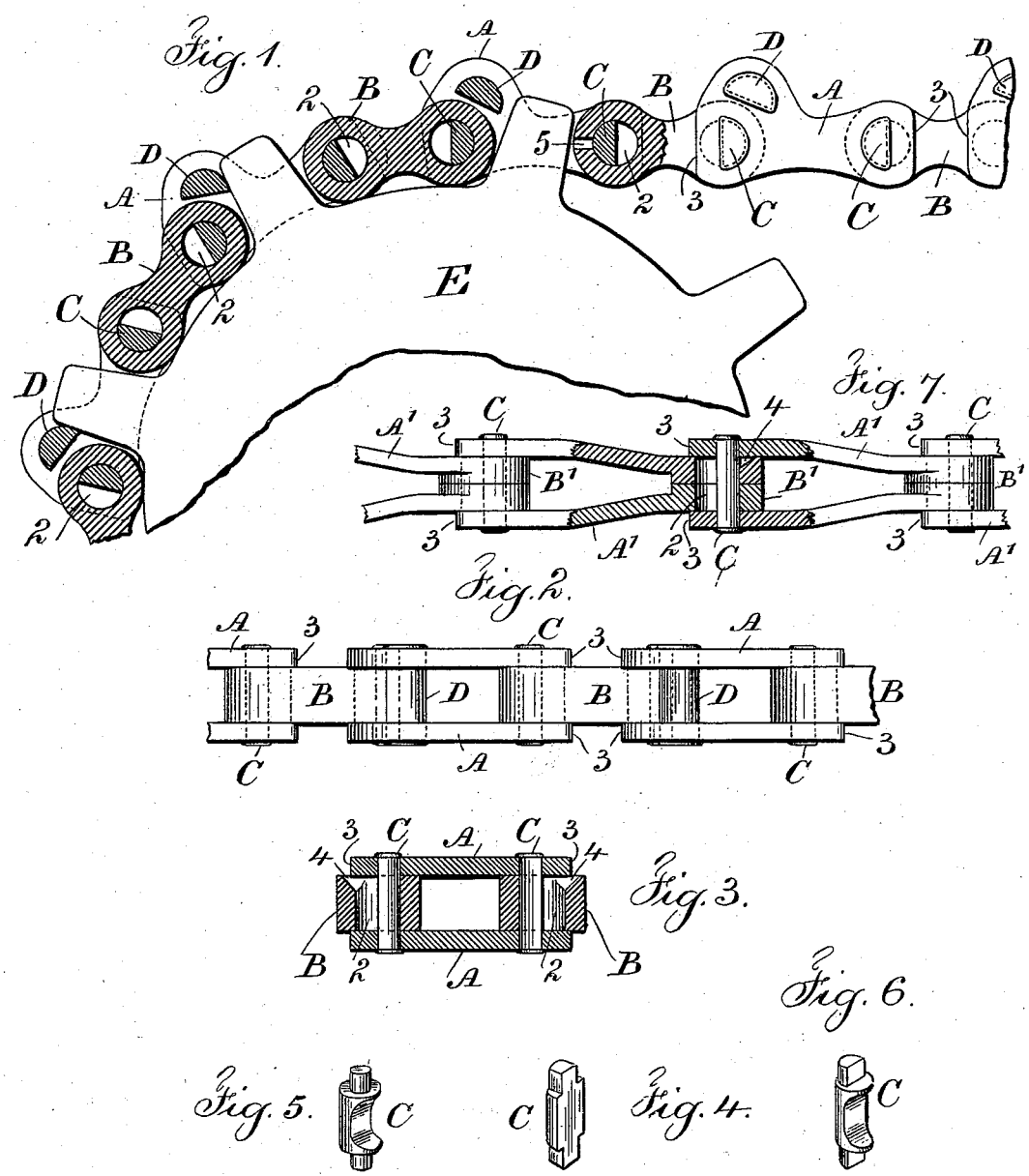
Witnesses
Chas. H. Smith
J. Staib
Inventor
George W. Bufford
per L. W. Serrell & Son
Attys.

UNITED STATES PATENT OFFICE.

GEORGE W. BUFFORD, OF BROOKLYN, NEW YORK.

CHAIN FOR SPROCKET-WHEELS.

SPECIFICATION forming part of Letters Patent No. 589,203, dated August 31, 1897.

Application filed January 6, 1897. Serial No. 618,144. (No model.)

*To all whom it may concern:*

Be it known that I, GEORGE W. BUFFORD, a citizen of the United States, residing at Brooklyn, in the county of Kings and State of New York, have invented an Improvement in Chains for Sprocket-Wheels, of which the following is a specification.

Chains that are used on sprocket-wheels are subject to considerable tension and to a motion while under tension that acts to wear the pivots and thus cause the chain to lengthen and speedily to wear out. Efforts have been made to supply lubricating material to the pivots of such chains, but the construction has been expensive and the lubricating material cannot be introduced with facility into the recesses that have been provided for it adjacent to the pivot-pins, because the plate-links usually set close against the sides of the intermediate links and prevent the lubricating material passing into the holes of the links and around the pivot-pins.

In my application Serial No. 568,003 a chain for sprockets of bicycles is represented, in which cross-pins are provided to bear against the projections of the sprocket-wheel, and these cross-pins swing back from the projections as the links draw into a tangential position.

The primary object of this invention is to provide for lubricating the pivot-pins of the chain and for retaining the lubricating material in direct contact with each pivot-pin, so that such lubricating material will spread reliably upon the inner surfaces of the links at the holes through which the pivot-pins pass, and with this object in view the pivot-pin, instead of being cylindrical, is cut off or recessed at the side opposite to the bearing, so as to hold the lubricating material directly upon the pivot-pin and to insure the spread of the same within the hole. I also provide for connecting the pivot-pins with the plate-links in such a manner that there is no risk of the pivot-pin turning around to bring the recessed or cut-away side in position to take the bearing or strain, and by this construction the weight of the chain is very much lessened and its reliability insured. I also provide for giving access to the oil-receptacle by turning the links upon their pivots closely adjacent to each other and opening a channel which ordinarily is closed, so that lubricating material can be easily introduced to the pivot-pin and to the recess for holding the same; and as an improvement upon the chain shown in the aforesaid application I employ a cross-pin cut away at one side to set closely against the intermediate joint or link and thereby lessen the size and weight of the chain without diminishing the strength.

In the drawings, Figure 1 is a section representing a part of the improved chain and of a sprocket-wheel. Fig. 2 is a plan view, and Fig. 3 a section, showing the opening for the introduction of lubricating material when the links of the chain are swung closely together. Fig. 4 shows one of the improved pivot-pins detached, and Fig. 5 shows a modification in the shape and size of the recesses for the lubricating material. Fig. 6 shows the same pivot-pin as in Fig. 5 except that the ends are half round instead of circular. Fig. 7 is a partial section showing the improvement applied to chain-links that are all similar, the ends of one link coming between the ends of the next.

The plate-links are represented at A and the intermediate links at B, and the pivots C pass through the plate-links and through the holes in the intermediate links, and the ends of the pivot-pins are riveted up. The pins C do not fill the round holes in the links B, such pivot-pins being segmental or cut away to leave a chamber 2 for lubricating material adjacent to each pin, and these are placed so that the portions of the pins that take the bearings against the intermediate links when the chain is under tension are half cylindrical, so that the wearing surfaces of the pivot-pins are not reduced in size, but the lubricating-chambers are upon the opposite sides, where there is neither contact nor wear.

I prefer to make the pivot-pins of wire that is a half-circle or rather more in section, and the holes in the plate-links A are to be cut out of the same shape to receive through them the pivot-pins, the heads being riveted up to hold the parts in place. This mode of construction effectually prevents the pivot-pins from turning in the plate-links, and it allows the pins to be riveted up closely, so as to confine the plate-links A against the sides of the intermediate links B, and it also causes the strain or tension between the links of the chain and the pivots to be taken upon flat surfaces which are perpendicular to the line of tension, and it also allows for the ends of the plate-links A to be cut off, as shown at 3, and this lessens the weight of the chain by lessening the amount of material in the pivot-pins and in the links, and the strength of the chain is not thereby diminished.

I find it advantageous to make a countersunk recess 4 near each edge of each intermediate link B, but upon one side only, so that by swinging the links closely together, as illustrated in Fig. 3, the countersunk portion 4 of each link will be adjacent to the cut-off ends 3 of the plate-links, and by swinging the links of the chain closely together and placing the chain so that the countersinks 4 come upward access is given for the lubricating material to pass through the countersinks 4 into the lubricating-chambers, and when the chain is drawn out into line the countersunk portions 4 are covered and substantially closed by the contact of the surfaces of the intermediate links B with the inner surfaces of the plate-links A. In this manner the lubricating material can be inserted, and it is confined when the chain is in use.

I remark that it is advantageous in lubricating the chain to first clean the same and swing the links closely into contact, as before mentioned, and place the chain with the countersinks 4 upward into melted vaseline, tallow, or similar material which is of sufficient consistency when cold to remain within the lubricating-chambers, and hence as the links of the chain swing upon the pivot-pins the lubricating material upon the pivot-pins and within the chambers is spread upon the surfaces of the intermediate links at the pivot-holes.

If desired, the ends of the pivot-pins C may be made with shoulders, as seen in Figs. 4 and 5, so that the plate-links can rest upon the shoulders as the ends of the pivot-pins are riveted up. The lubricating-chambers may be formed at one side of round pivot-pins, as illustrated in Fig. 5. The plate-links A in a chain for bicycles are made sufficiently wide at one end for receiving the cross bearing-pins D, and by making these bearing-pins of half-cylindrical wire, as shown, and placing the flat surfaces of the bearing-pins adjacent to the circular ends of the intermediate links B the parts are rendered very compact and the strength of the bearing-pins D is not materially lessened, because the diameter of the pin remains unchanged, and such diameter is perpendicular, or nearly so, to the line of pressure as the tension upon the chain causes the cross bearing-pins D to press against the projections of the driven sprocket-wheel E, and such bearing-pins D swing back from contact with the sprocket-wheel projections as the links swing from the position of a chord to that of a tangent as the chain leaves the driven sprocket-wheel.

By these improvements the chain is lubricated reliably and the lubricating material is in chambers holding a sufficient quantity, so as to require replenishing but seldom, opportunity is furnished for introducing the lubricating material with facility, and such lubricating material is closely confined when the chain is straightened for use. The chain is made as light and compact as consistent with strength, and the cross bearing-pins are lighter than those heretofore used by me, and the plate-links receiving the same are smaller, but the strength of the chain is not lessened.

I remark that while it is advantageous to use the countersinks 4 in the manner before mentioned for allowing the lubricating material to pass into the chambers the other parts of the present improvement might be used with holes bored in the ends of the links B, as shown at 5, with holes, of course, coincide with the lubricating-chambers when the links are swung and packed together closely, but these holes are liable to accumulate dust and are not as advantageous as the countersinks.

In Fig. 7 the plate-links A' are shown as bent, so that the ends of one link pass between the ends of the next link, and they are made with offsets or butts B', that take the bearings against the sprocket projections and become the equivalents of the intermediate links, and the pivot-pins C, oil-chambers 2, countersinks 4, and straight ends 3 are to be as before described.

The recesses in the pivot-pins are preferably of the form shown in Figs. 5 and 6, because the pins fitting the ends of the holes in the intermediate links retain the lubricating material to the best advantage.

I do not claim a chain with half-round or nearly half-round connecting-pins, as I am aware that the same have been used with rolling or pivot bearings in the same holes. In this instance the connecting-pins stand in the opposite direction to mine and they do not take any bearing directly on the links, but, on the contrary, the tension tends to separate the parts.

I claim as my invention—

1. The combination in a sprocket-chain with the plate-links and intermediate links or butts having round holes, of pivot-pins, each formed as a segment of a cylinder and rigidly attached at the ends to the plate-links, so that the cylindrical surface takes the bearing within the round hole, there being a chamber for lubricating material at the opposite side to the bearing-surface, substantially as set forth.

2. The combination in a sprocket-chain with intermediate links or butts having round holes through them, of segmental cylindrical pivot-pins passing through the round holes, and exterior plate-links having through them holes of the same sectional shape as the pivot-pins, each pivot-pin passing through the holes and being riveted up, the curved sides of the holes being toward the middle of the links, so that the cylindrical surfaces of the pins take their bearings within the round holes, substantially as set forth.

3. The combination in a sprocket-chain with the intermediate links or butts, of plate-links having straight ends, pivot-pins passing through the links and recessed for lubricating material within the round holes of the intermediate links or butts, such intermediate links being countersunk near their ends to form channel-ways for the introduction of lubricating material when the links are swung closely together, substantially as set forth.

4. The combination in a sprocket-chain, of intermediate links and plate-links, pivot-pins passing through the respective links, and cross bearing-pins passing through the plate-links and having their longest diameter substantially perpendicular to the projection upon the sprocket-wheel, as set forth.

5. The combination in a sprocket-chain, of intermediate links and plate-links, pivot-pins passing through the respective links and half-cylindrical cross bearing-pins passing through the plate-links and having their flat sides closely adjacent to the round ends of the intermediate links, substantially as set forth.

6. The combination in a sprocket-chain with the links or butts, of pivot-pins passing through the links and having recesses for lubricating material at the sides that are opposite to the cylindrical surfaces of the pivot-pins that take the bearings, and openings in the links that are uncovered by swinging the adjacent links closely together, so that lubricating material can be passed through such openings into the recesses of the pivot-pins, and such openings will be covered when the chain is drawn out with the links in their normal positions, substantially as set forth.

7. The combination with the chain-links, of pivot-pins passing at their ends through holes in the outer links and riveted up so as not to turn, and passing through round holes in the intermediate links and filling the ends of the holes, and such pivot-pins having recesses in their sides opposite the bearing-surfaces for holding lubricating material and spreading the same around the interior of the intermediate links by the movement of the links in relation to the pin, substantially as specified.

Signed by me this 31st day of December, 1896.

GEORGE W. BUFFORD.

Witnesses:
FRED G. SACKEN, Jr.,
JOHN E. KITSON.